United States Patent
An et al.

(10) Patent No.: US 6,771,254 B2
(45) Date of Patent: Aug. 3, 2004

(54) STYLUS NIBS FOR PROVIDING A PEN-AND-PAPER FEEL FOR USE WITH A TABLET-AND-STYLUS COMPUTER

(75) Inventors: Bin An, Woodinville, WA (US); Vincent Jesus, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/795,822

(22) Filed: Feb. 28, 2001

(65) Prior Publication Data

US 2002/0057261 A1 May 16, 2002

Related U.S. Application Data

(60) Provisional application No. 60/247,842, filed on Nov. 10, 2000, provisional application No. 60/247,182, filed on Nov. 10, 2000, provisional application No. 60/247,841, filed on Nov. 10, 2000, provisional application No. 60/247,973, filed on Nov. 10, 2000, provisional application No. 60/247,844, filed on Nov. 10, 2000, provisional application No. 60/247,400, filed on Nov. 10, 2000, provisional application No. 60/247,972, filed on Nov. 10, 2000, provisional application No. 60/247,831, filed on Nov. 10, 2000, provisional application No. 60/247,843, filed on Nov. 10, 2000, provisional application No. 60/247,479, filed on Nov. 10, 2000, and provisional application No. 60/247,847, filed on Nov. 10, 2000.

(51) Int. Cl.[7] .................................................. G09G 5/00

(52) U.S. Cl. ........................ 345/173; 345/174; 345/175; 345/176; 345/179; 178/19.01; 178/19.02; 178/19.03; 178/19.04; 178/19.05; 15/445; 15/446

(58) Field of Search ................................. 345/173, 174, 345/175, 176, 179; 178/19.01, 19.02, 19.03, 19.04, 19.05; 15/445, 446

(56) References Cited

U.S. PATENT DOCUMENTS

| 4,838,723 | A | * | 6/1989 | Suzuki et al. | ............... | 401/198 |
| 5,627,348 | A | * | 5/1997 | Berkson et al. | .......... | 178/19.02 |
| 5,841,653 | A | * | 11/1998 | Reiffel et al. | ............ | 178/18.03 |
| 5,877,459 | A | * | 3/1999 | Prater | ...................... | 178/19.01 |

* cited by examiner

Primary Examiner—Richard Hjerpe
Assistant Examiner—Jean Lesperance
(74) Attorney, Agent, or Firm—Banner & Witcoff, Ltd.

(57) ABSTRACT

A nib for a stylus for use with a tablet and stylus computer. The nib provides a desired amount of firmness and friction between the stylus and a writing surface of the tablet and stylus computer. A nib substrate material approximates a desired nib-and-writing-surface firmness and a desired amount of friction between the nib and the writing surface. A secondary material is optionally added to the nib substrate material to alter the amount of friction between the stylus nib and the writing surface.

35 Claims, 7 Drawing Sheets

STYLUS NIBS FOR PROVIDING A PEN-AND-PAPER FEEL FOR USE WITH A TABLET-AND-STYLUS COMPUTER

TECHNICAL FIELD

The present invention relates generally to styluses for use in interacting with a tablet-and-stylus computer. More particularly, the invention relates to various designs, and design considerations, of stylus nibs, also referred to as writing tips, for such styluses.

BACKGROUND OF THE INVENTION

As used herein, the term Tablet PC refers to, by way of example, without limitation, a full-function "MICROSOFT" "WINDOWS" operating system-based personal computer incorporating various convenient and intuitive aspects of pencil and paper into a user's interaction with a PC. Such Tablet PCs provide a very natural way to interact with a computer, namely, by writing on it, without sacrificing the power or utility of various "WINDOWS" operating systems and/or various "WINDOWS" operating system-based desktop applications. As will be apparent, Tablet PCs, as the term is used herein, are not limited to computers running a "WINDOWS" operating system. Instead, a Tablet PC, may run any other known, or later-developed, operating system.

Tablet PC's are likely to become increasingly popular for a variety of reasons. For instance, in the context of taking notes during a meeting, a Tablet PC presents less of a barrier between individuals than does a laptop computer. In addition, Tablet PC's allow for capturing of handwritten notes so that Tablet PC users are able to take notes in their own handwriting, in an unobtrusive manner similar to taking handwritten notes with a pen and paper. While providing the simplicity of pen and paper, Tablet PC's have the potential to provide many features and benefits provided by word processors and other personal computer software, including sharing of notes among meeting participants in real-time during a meeting via a wireless communication link, for instance. Additional advantages over pen and paper include, but are not limited to the ability to search notes for particular words, including "fuzzy finds," and the ability to input information in other ways including speaking and any other suitable means for inputting information.

Among other ways of entering textual information, Tablet PC users will often use a stylus, also referred to herein as a pen, to write on a display area of the Tablet PC. Such a pen or stylus may also be used as a pointing device directly on the screen or above the screen to make various in-air gestures.

Conventional pens or styluses, such as those commonly used with a Personal Digital Assistant, typically have a writing tip, also referred to herein as a nib, made of hard plastics. The interaction of such nibs to the writing surfaces on which they are commonly used is often undesirably hard, slippery, and noisy. Some conventional nibs, such as the DigitalWriter from A.T. Cross Company, are made of a soft polymer material. Even though the soft polymer nib is an improvement over a hard plastic nib, the interaction of a soft polymer nib is still undesirable on many writing surfaces.

Accordingly, there is a need for various nib designs that provide an improved "pen and paper" feel to a user that is interacting with a Tablet PC by writing on the display surface of the Tablet PC.

SUMMARY OF THE INVENTION

A nib for a stylus for use with a tablet and stylus computer overcomes the foregoing shortcomings of conventional styluses. In accordance with various inventive principles, a desired amount of firmness and friction between the stylus and a writing surface of the tablet and stylus computer is provided. Such an inventive nib may include a nib substrate material that approximates a desired nib-and-writing-surface firmness and a secondary material added to the nib substrate material to produce a desired amount of friction between the nib and the writing surface. The intended writing surface may be a liquid crystal display or a liquid crystal display overlay. The nib substrate material may be coated, overmolded, or impregnated with the secondary material.

The nib substrate material may be a porous material impregnated with a dry lubricant or Teflon. The nib substrate material could be nylon fiber optionally impregnated with Teflon. The nib substrate material could include a Teflon fiber and one or more additional types of fiber including Nylon, cellulose acetate, and/or polyester. The nib substrate material could include polyester, and the secondary material could include a fiber wrap, optionally including Teflon, surrounding the nib substrate material.

Additional features and advantages of the invention will be apparent upon reviewing the following detailed description.

DETAILED DESCRIPTION OF THE INVENTION

Figure 1:
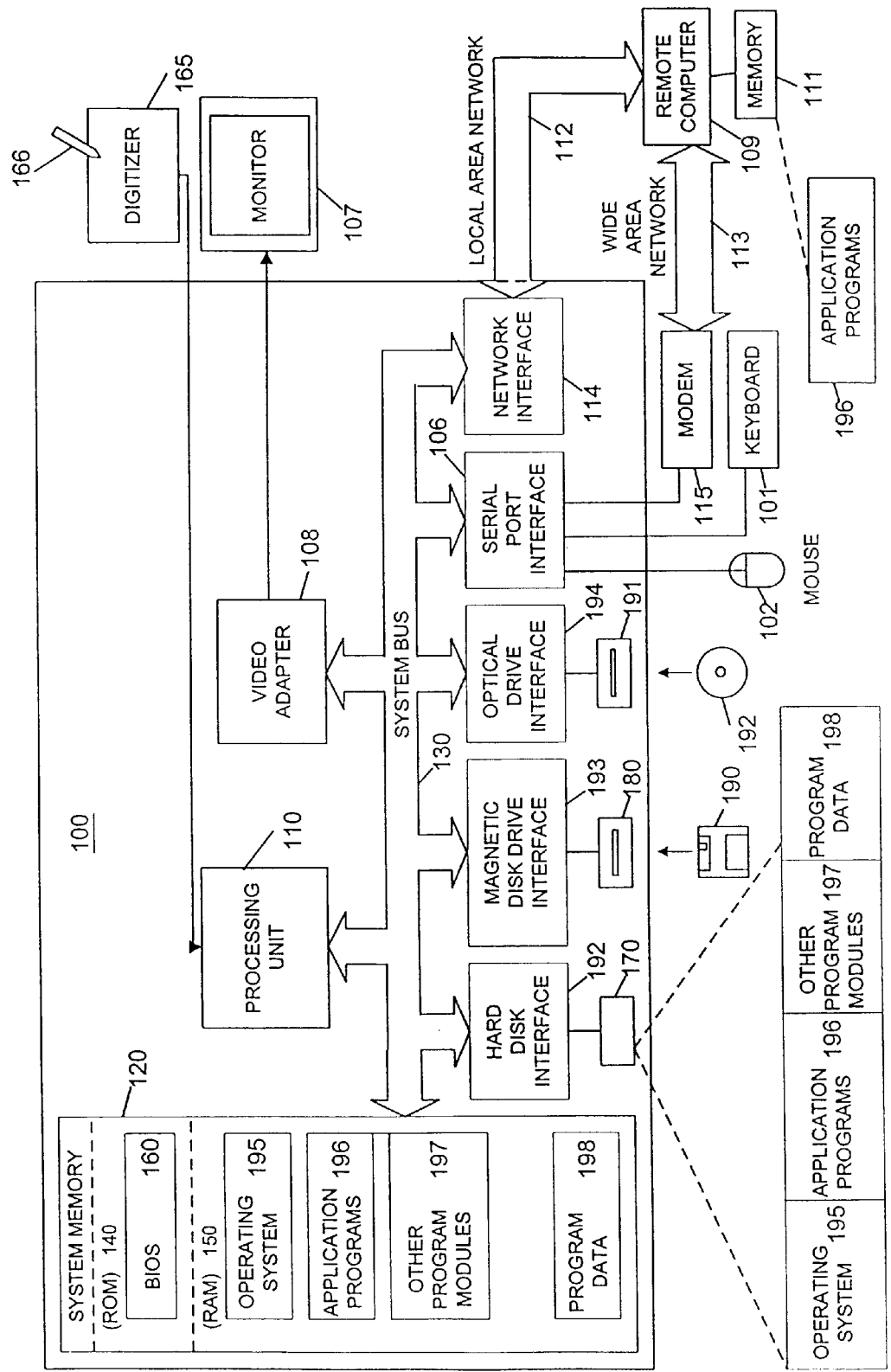
FIG. 1 is a schematic block diagram of a conventional general-purpose digital computing environment that can be used to implement various aspects of the present invention.

The present invention may be more readily described with reference to FIGS. 1–8. FIG. 1 illustrates a schematic diagram of a conventional general-purpose digital computing environment that can be used in conjunction with various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing communication over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
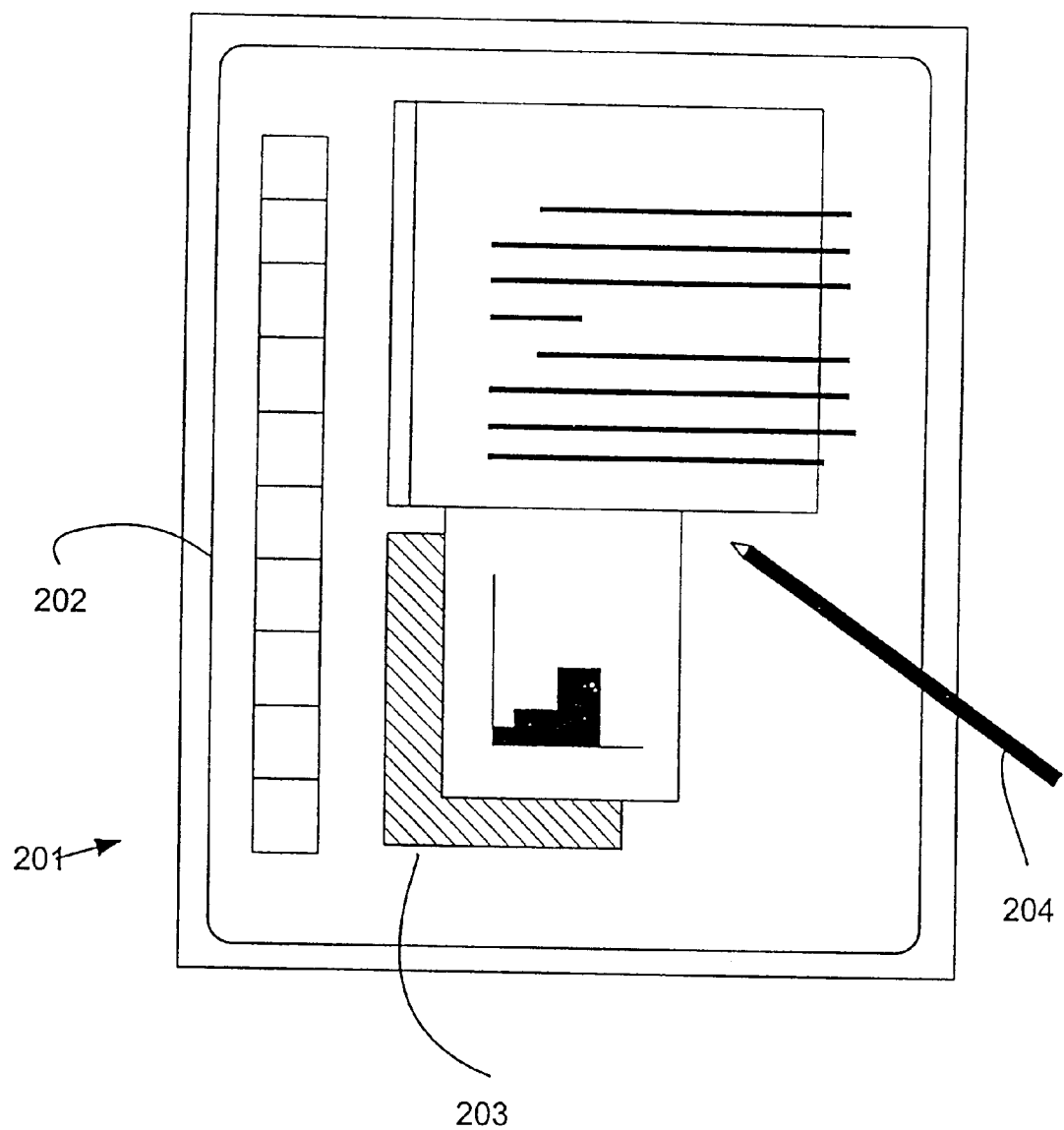
FIG. 2 illustrates a tablet and stylus computer that can be used in accordance with various aspects of the present invention.

FIG. 2 illustrates a tablet and stylus computer, also referred to herein as a Tablet PC, that can be used in accordance with various aspects of the present invention. Any or all of the features, subsystems, and functions in the system of FIG. 1 can be included in the computer of FIG. 2. The computer 201 includes a large display surface 202, e.g., a digitizing flat panel display, preferably, a liquid crystal display (LCD) screen, on which a plurality of graphical user interface windows 203 is displayed. The display is preferably oriented in "portrait" mode (i.e., vertically), as opposed to "landscape" mode (i.e., horizontally). Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Additionally, a user's own finger could be used for selecting or indicating portions of the displayed image on a touch-sensitive or proximity-sensitive display.

Figure 3:
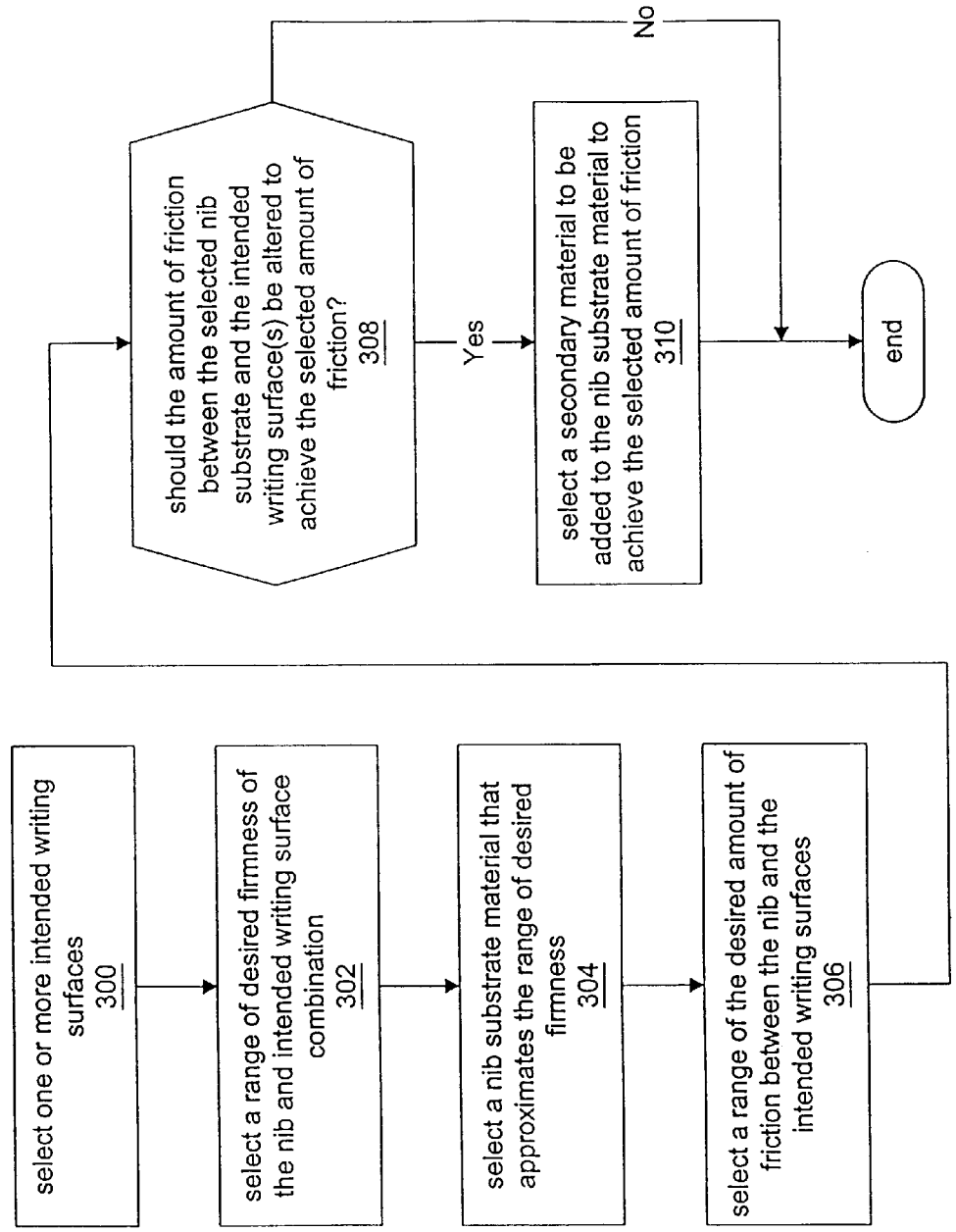
FIG. 3 is a flowchart depicting selection of nib design parameters in accordance with various inventive principles.

FIG. 3 is a flowchart depicting selection of nib design parameters in accordance with various inventive principles. The steps depicted in FIG. 3 are directed to designing a pen nib, or stylus nib, for use with a Tablet PC that will accurately simulate a "pen and paper" interaction for a comfortable and natural handwriting experience. Many factors, such as stiffness, static friction (or stiction), dynamic friction, sound, texture and the like, affect the accuracy of the simulation of pen and paper interaction. Matching all of these factors to provide a true "pen and paper" experience, however, is impractical. Nevertheless, the steps depicted in FIG. 3 illustrate a design process that simplifies these many and complex factors. In accordance with principles of this invention, nib designs are focused on two of the relatively more important parameters: nib stiffness and friction between the nib and an intended writing surface.

Referring to FIG. 3, at step 300, one or more intended writing surfaces are selected. An intended writing surface may be a surface of a display device, such as a liquid crystal display ("LCD"). An intended writing surface may also be an overlay for such a display device.

As depicted at step 302, a range of desired firmness of the nib and the one or more intended writing surfaces is selected. Various ranges of firmness may be selected to approximate the firmness provided by various pen and paper writing scenarios, such as writing on a full pad of paper, writing on a single sheet of paper on a hard surface, such as a glass tabletop, and other analogous degrees of firmness.

Once the intended writing surface or surfaces and the desired range of firmness have been selected, a nib substrate material that approximates the desired range of firmness may be selected, as depicted at step 304. Examples of suitable nib substrate materials are provided below.

Once the intended writing surface or surfaces have been selected and the nib substrate material has been selected, a range of the desired amount of friction between the nib and the intended writing surface or surfaces may be selected, as depicted at 306. Such a range of the desired amount of friction could include the amount of friction experienced by a person writing with a fine-tipped ball point pen, a medium-tipped ball point pen, a felt-tipped marker, a pencil, and the like, on a piece of paper.

Once the range of the desired amount of friction has been selected, a determination may be made, as shown at 308, as to whether the amount of friction between the selected nib substrate and the intended writing surface or surfaces should be altered to achieve the selected amount of friction.

In some cases, the nib substrate material will offer desirable interaction stiffness and frictional characteristics on certain writing surfaces. Under these circumstances, the "no" branch from 308 would be followed to the end of the nib design criteria selection process depicted in FIG. 3.

If the amount of friction between the selected nib substrate and the intended writing surface or surfaces should be altered to achieve the selected amount of friction, then the "yes" branch from 308 is followed to step 310. At step 310, a secondary material to be added to the nib substrate material in order to achieve the selected amount of friction is selected. Examples of such secondary materials are provided below.

Figure 4:
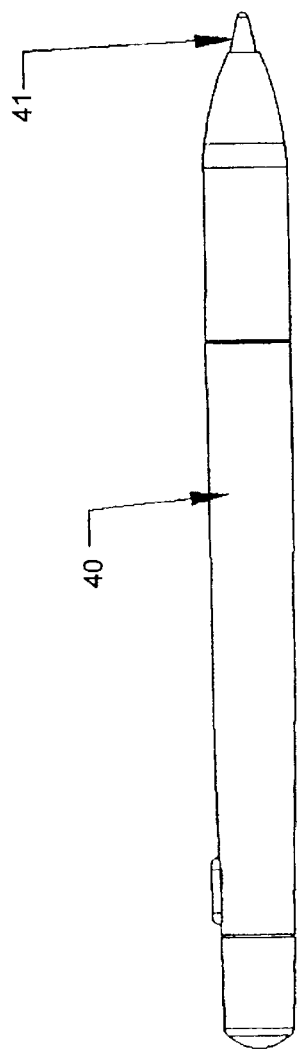
FIG. 4 depicts a pen or stylus body and a nib.

Turning now to discussion of various examples of nibs constructed in accordance with certain inventive principles, FIG. 4 depicts a pen or stylus body 40 and a nib 41. As depicted in FIG. 4, in accordance with certain inventive principles, a nib 41 may be generally conically shaped with a semi-hemispherically shaped end of the nib distal to the pen body.

Figure 5:
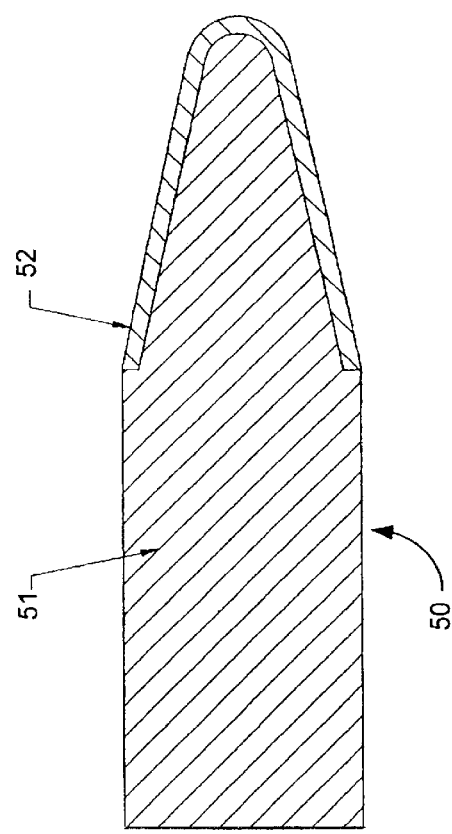
FIG. 5 depicts a nib comprising a substrate material that provides a desired nib stiffness and that is coated with a secondary material to provide a desired amount of friction.

FIG. 5 depicts a nib 50 comprising a substrate material 51 that provides a desired nib stiffness and that is coated with a secondary material to provide a desired amount of friction. Alternatively, the nib substrate 51 could be impregnated with the secondary material, or the secondary material 52 could be molded over the nib substrate to provide a desired amount of friction.

Figure 6:
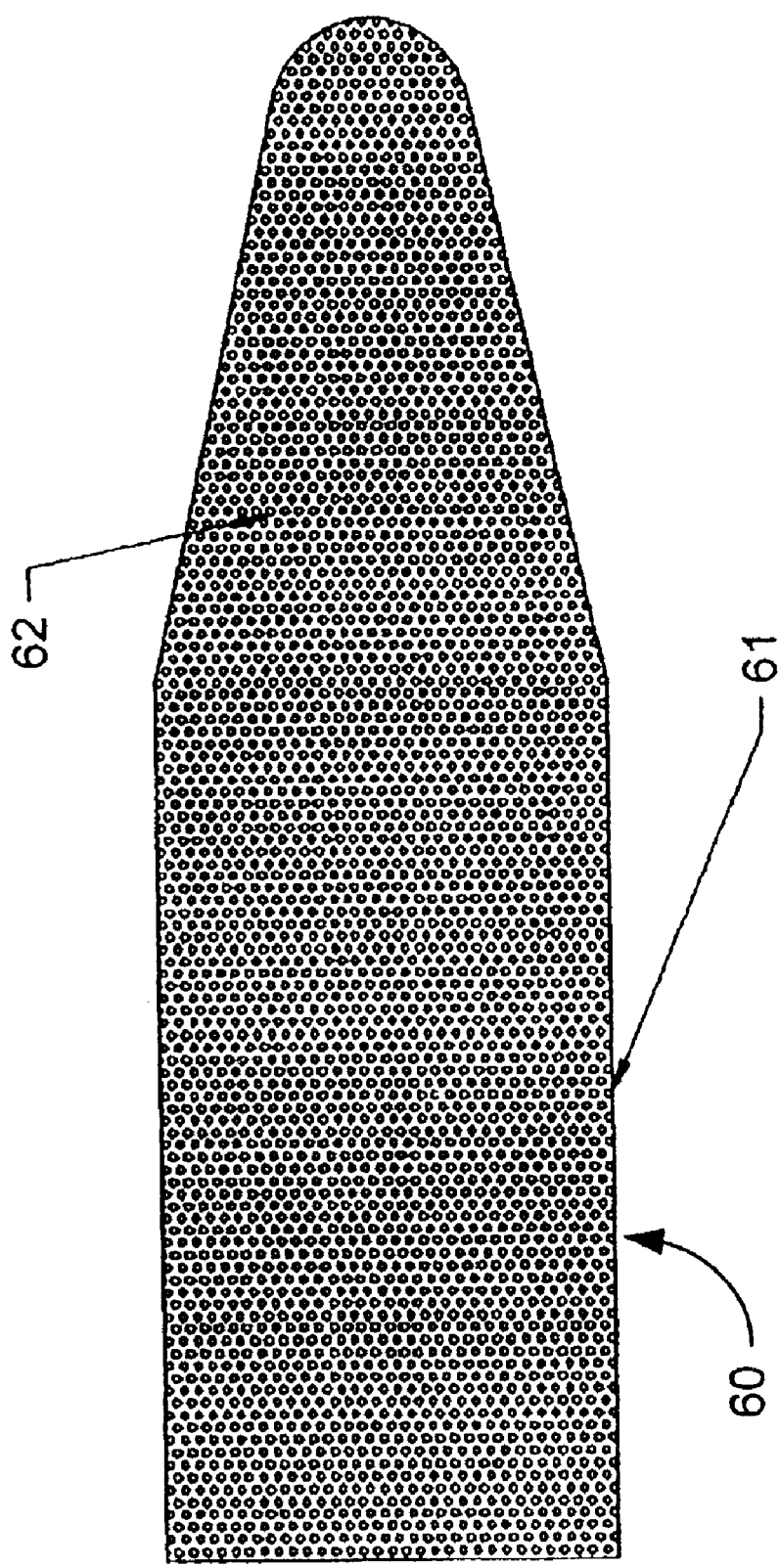
FIG. 6 depicts a nib comprising a porous substrate material providing a desired nib stiffness impregnated with a lubricant, such as Teflon, to provide a desired amount of friction.

FIG. 6 depicts a nib 60 comprising a porous substrate material 61 providing a desired nib stiffness impregnated with a lubricant 62, such as Teflon, to provide a desired amount of friction. A Nylon fiber nib impregnated with Teflon or a different dry lubricant may be used. Because Teflon has static and dynamic friction coefficients that are the same, Teflon offers a feel that closely approximates the feel of a high-quality ballpoint pen.

Figure 7:
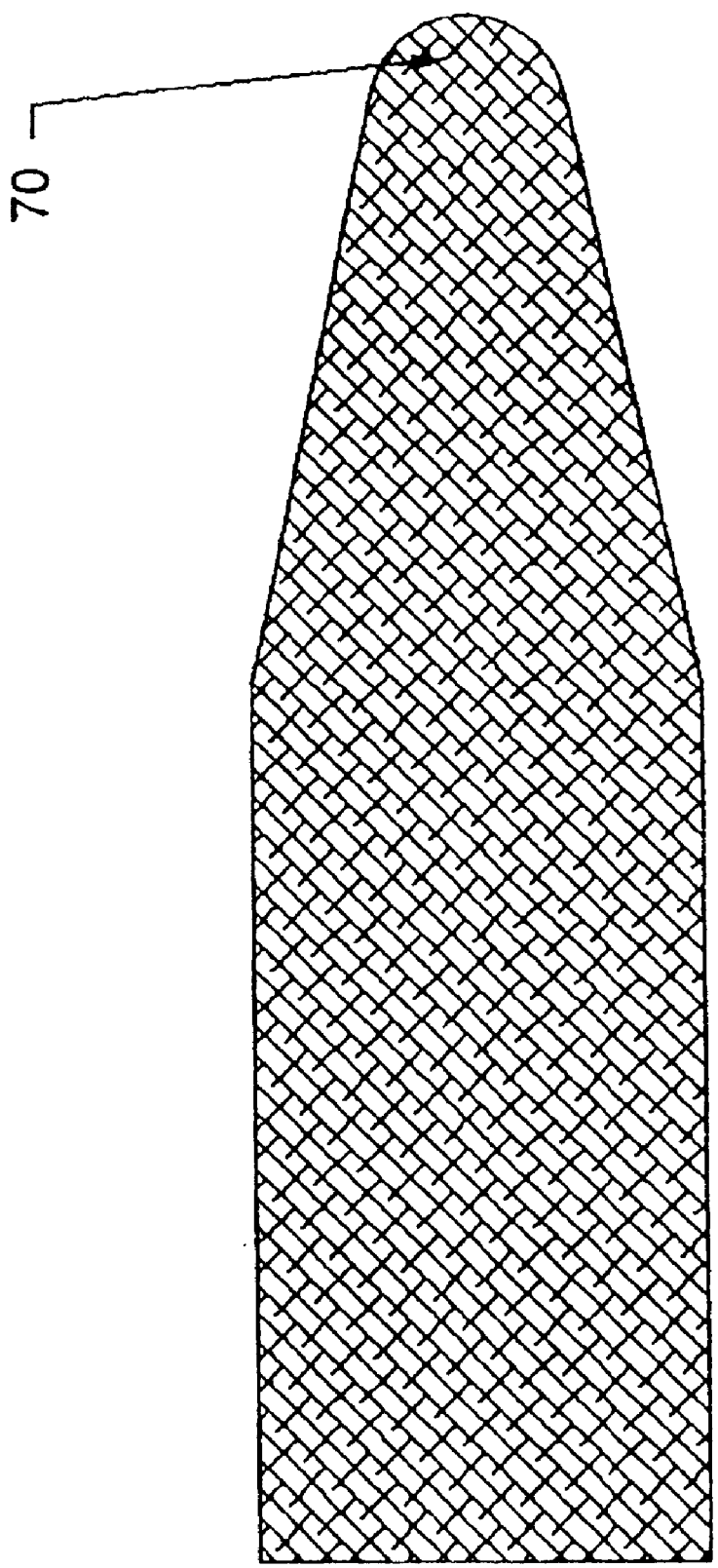
FIG. 7 depicts a felt nib made of Teflon and other fibers, such as Nylon, cellulose acetate, and/or polyester fiber, that are typically used in felt-tip ink pens.

FIG. 7 depicts a felt nib 70 made of Teflon and other fibers, such as Nylon, cellulose acetate, and/or polyester fiber, that are typically used in felt-tip ink pens. Manufacturing processes similar to manufacturing processes used to make a conventional felt-tip pen may be used. Teflon fiber provides desirable friction characteristics. When the fiber bonds together as a felt, it offers a stiffness and texture analogous to that provided by writing with a pen on a piece of paper.

Figure 8:
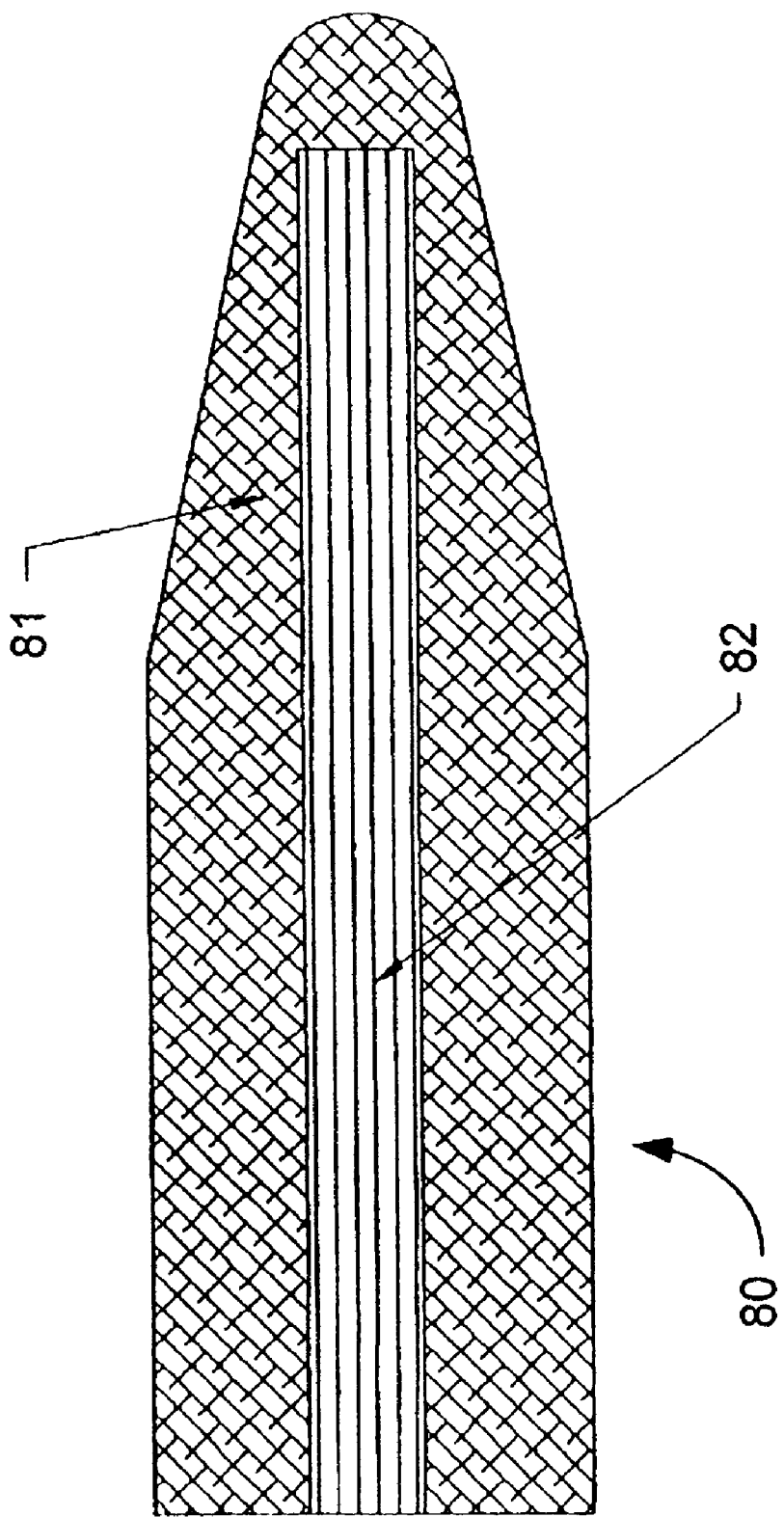
FIG. 8 depicts a nib comprising a substrate material, such as Polyester, surrounded by a Teflon fiber wrap.

FIG. 8 depicts a nib 80 comprising a substrate material 81, such as Polyester, surrounded by a Teflon fiber wrap 82.

Various suitable methods of bonding the substrate material and the secondary material, many of which are well known in the art and which depends on the physical, chemical, and thermal properties of these two materials and the relevant manufacturing processes, may be used.

What has been described above is merely illustrative of the application of the principles of the present invention. Those skilled in the art can implement other arrangements and methods without departing from the spirit and scope of the present invention.

We claim:

1. A method for designing a nib for a stylus for use with a computer having a writing surface to provide a desired amount of firmness and friction between the stylus and the writing surface of the computer, the method comprising steps of:

selecting a desired firmness of a combination of the nib and the writing surface, wherein the selected desired firmness approximates an amount of firmness experienced while writing with an ink-dispensing pen on paper;

selecting a nib substrate material that approximates the selected desired firmness;

selecting a desired amount of friction between the nib and the writing surface, wherein the selected desired amount of friction between the nib and the writing surface approximates an amount of friction experienced while writing with an ink-dispensing pen on paper;

determining whether a secondary material should be added to the nib substrate material for producing the selected desired amount of friction between the nib and the writing surface; and adding the secondary material to the nib substrate when the secondary material should be added to the nib substrate material for producing the selected desired amount of friction between the nib and the writing surface.

2. The method of claim 1, wherein the computer is a tablet and stylus computer.

3. The method of claim 1, further comprising a step of selecting an intended writing surface.

4. The method of claim 3, wherein the step of selecting the intended writing surface comprises a step of selecting a liquid crystal display as the intended writing surface.

5. The method of claim 3, wherein the step of selecting the intended writing surface comprises a step of selecting a liquid crystal display overlay as the intended writing surface.

6. The method of claim 1, wherein the step of adding the secondary material to the nib substrate comprises a step of coating the nib substrate material with the secondary material.

7. The method of claim 1, wherein the step of adding the secondary material to the nib substrate comprises a step of molding the secondary material over the nib substrate material.

8. The method of claim 1, wherein the step of adding the secondary material to the nib substrate comprises a step of impregnating the nib substrate material with the secondary material.

9. The method of claim 1, wherein the step of selecting the nib substrate material comprises a step of selecting a porous substrate material.

10. The method of claim 9, wherein the step of adding the secondary material to the nib substrate comprises a step of impregnating the porous nib substrate material with Teflon.

11. The method of claim 9, wherein the step of adding the secondary material to the nib substrate comprises a step of impregnating the porous nib substrate material with a dry lubricant.

12. The method of claim 1, wherein the step of selecting the nib substrate material comprises a step of selecting a nylon fiber substrate material.

13. The method of claim 12, wherein the step of adding the secondary material to the nib substrate comprises a step of impregnating the nylon fiber substrate material with Teflon.

14. The method of claim 1, wherein the step of selecting the nib substrate material comprises a step of selecting a felt nib material made of Teflon and at least one other fiber selected from a group consisting of Nylon, cellulose acetate, and polyester.

15. The method of claim 1, wherein the step of selecting the nib substrate material comprises a step of selecting a polyester substrate material.

16. The method of claim 15, wherein the step of adding the secondary material to the nib substrate comprises a step of surrounding the nib substrate material with a fiber wrap.

17. The method of claim 16, wherein the step of surrounding the nib substrate material with a fiber wrap comprises a step of surrounding the nib substrate with a Teflon fiber wrap.

18. A nib for a stylus for use with a computer having a writing surface for providing a desired amount of firmness and friction between the stylus and the writing surface, the nib comprising:
- a nib substrate material that approximates the desired nib-and-writing-surface firmness wherein the desired nib-and-writing-surface firmness approximates an amount of firmness experienced while writing with an ink-dispensing pen on paper; and
- a secondary material added to the nib substrate material to produce the desired amount of friction between the nib and the writing surface, wherein the desired amount of friction between the nib and the writing surface approximates an amount of friction experienced while writing with an ink-dispensing pen on paper.

19. The nib of claim 18, wherein the computer is a tablet and stylus computer.

20. The nib of claim 18, wherein the writing surface comprises a liquid crystal display.

21. The nib of claim 18, wherein the writing surface comprises a liquid crystal display overlay.

22. The nib of claim 18, wherein the nib substrate material is coated with the secondary material.

23. The nib of claim 18, wherein the secondary material is molded over the nib substrate material.

24. The nib of claim 18, wherein the nib substrate material is impregnated with the secondary material.

25. The nib of claim 18, wherein the nib substrate material comprises a porous material.

26. The nib of claim 25, wherein the porous nib substrate material is impregnated with Teflon.

27. The nib of claim 25, wherein the porous nib substrate material is impregnated with a dry lubricant.

28. The nib of claim 18, wherein the nib substrate material comprises nylon fiber.

29. The nib of claim 28, wherein the nylon fiber material is impregnated with Teflon.

30. The nib of claim 18, wherein the nib substrate comprises a Teflon fiber and at least one other fiber selected from a group consisting of Nylon, cellulose acetate, and polyester.

31. The nib of claim 18, wherein the nib substrate material comprises polyester.

32. The nib of claim 31, wherein the secondary material comprises a fiber wrap surrounding the nib substrate material.

33. The nib of claim 32, wherein the fiber wrap comprises Teflon.

34. A nib for a stylus for use with a computer having a writing surface, the nib comprising: substrate-material means for approximating a desired amount of firmness of a combination of the nib and the writing surface, wherein the desired firmness approximates an amount of firmness experienced while writing with an ink-dispensing pen on paper; and secondary-material means for providing a desired amount of friction between the nib and the writing surface, wherein the desired amount of friction between the nib and the writing surface approximates an amount of friction experienced while writing with an ink-dispensing pen on paper.

35. The nib according to claim 34, wherein the computer is a tablet and stylus computer.

* * * * *